(12) United States Patent
Wasti

(10) Patent No.: US 12,519,836 B1
(45) Date of Patent: Jan. 6, 2026

(54) DISTRIBUTED CONFIGURATION MANAGEMENT FOR SECURE HARDWARE

(71) Applicant: Amazon Technologies, Inc., Reno, NV (US)

(72) Inventor: Byron Wasti, Cambridge, MA (US)

(73) Assignee: Amazon Technologies, Inc., Reno, NV (US)

(*) Notice: Subject to any disclaimer, the term of this patent is extended or adjusted under 35 U.S.C. 154(b) by 268 days.

(21) Appl. No.: 18/329,925

(22) Filed: Jun. 6, 2023

(51) Int. Cl.
*H04L 9/40* (2022.01)

(52) U.S. Cl.
CPC .................. *H04L 63/20* (2013.01)

(58) Field of Classification Search
CPC ........................................................ H04L 63/20
USPC ............................................................ 726/1
See application file for complete search history.

(56) References Cited

U.S. PATENT DOCUMENTS

| | | | |
|---|---|---|---|
| 10,425,225 B1* | 9/2019 | Grubin | H04L 9/0643 |
| 2018/0006820 A1* | 1/2018 | Arasu | G06F 16/00 |
| 2018/0019869 A1* | 1/2018 | Savage | H04L 63/0435 |
| 2021/0234681 A1* | 7/2021 | Buendgen | H04L 9/0897 |

* cited by examiner

*Primary Examiner* — Anthony D Brown
(74) *Attorney, Agent, or Firm* — Hogan Lovells US LLP

(57) ABSTRACT

Approaches presented herein relate to the configuration of a secure hardware device, such as a hardware security module (HSM). A distributed set of independent services can be used to configure different settings for the HSM, without ensuring a specific ordering of operation. Each service can set the appropriate configuration, and if successful can indicate that the service is in a healthy state. Each indication can include a logical timestamp, such as a Lamport timestamp that is incremented from a last determined timestamp. A health service can monitor the state information reported by these various services to determine when all services have reported a healthy state. To ensure no settings were modified by another service since the reporting, the health service can set a high water timestamp, and can wait until all services report a healthy state with timestamps greater than the high water timestamp, before deploying the HSM.

20 Claims, 8 Drawing Sheets

| Primary Key | Desired Configuration | Discovery State | Firmware State | Configuration State | Overall Health State |
|---|---|---|---|---|---|
| PK:0000 | {<br>Firmware_ver: v2.4,<br>Config: {<br>...<br>}<br>Accounts: [...] | {<br>State: Healthy<br>ip: 192.0.0.0<br>timestamp: 5<br>} | {<br>State: Healthy<br>timestamp: 6<br>} | {<br>State: Healthy<br>timestamp: 6<br>} | {<br>State: Healthy<br>timestamp: 7<br>} |
| PK:0001 | {<br>Firmware_ver: v2.4,<br>Config: {<br>...<br>}<br>Accounts: [...] | {<br>State: Healthy<br>ip: 192.0.0.1<br>timestamp: 5<br>} | {<br>State: Healthy<br>timestamp: 6<br>} | {<br>State: Updating<br>timestamp: 6<br>} | {<br>State: UNHEALTHY<br>timestamp: 7<br>} |
| PK:0002 | {<br>Firmware_ver: v2.5,<br>Config: {<br>...<br>}<br>Accounts: [...] | {<br>State: Healthy<br>ip: 192.0.0.2<br>timestamp: 5<br>} | {<br>State: NEEDS_UPDATE<br>timestamp: 6<br>} | {<br>State: Healthy<br>timestamp: 6<br>} | {<br>State: UNHEALTHY<br>timestamp: 7<br>} |
| PK:0003 | {<br>Firmware_ver: v2.5,<br>Config: {<br>...<br>}<br>Accounts: [...] | {<br>State: Healthy<br>ip: 192.0.0.3<br>timestamp: 5<br>} | {<br>State: Healthy<br>timestamp: 6<br>} | {<br>State: Healthy<br>timestamp: 6<br>} | {<br>State: WAIT<br>wait_out: 7<br>timestamp: 7<br>} |
| PK:0004 | {<br>Firmware_ver: v2.5,<br>Config: {<br>...<br>}<br>Accounts: [...] | {<br>State: Healthy<br>ip: 192.0.0.4<br>timestamp: 5<br>} | {<br>State: NO-CONN<br>timestamp: 6<br>} | {<br>State: NO-CONN<br>timestamp: 6<br>} | {<br>State: UNHEALTHY<br>timestamp: 7<br>} |
| PK:0005 | {<br>Firmware_ver: v2.4,<br>Config: {<br>...<br>}<br>Accounts: [...] | {<br>State: Healthy<br>ip: 192.0.0.5<br>timestamp: 5<br>} | {<br>State: Healthy<br>timestamp: 6<br>} | {<br>State: Healthy<br>timestamp: 6<br>} | {<br>State: UNHEALTHY<br>timestamp: 7<br>} |

FIG. 3

DISTRIBUTED CONFIGURATION MANAGEMENT FOR SECURE HARDWARE

BACKGROUND

There is a need, in a variety of computerized environments, to provide for the security of data and resources. This can include, for example, managing secrets such as cryptographic keys, as well as performing tasks relating to encryption and authentication. A mechanism that can be used to help provide such security is a hardware security module (HSM), which typically takes the form of a hardware device that can securely store secrets and use those secrets with a crypto processor to perform a variety of security-related tasks. HSMs used in production are often required to be configured in a specific way along a number of different dimensions, such as permissions, users, firmware, behavior, and certificates. In many instances, the various settings and configuration parameters need to be set in a specific order for an HSM to be production ready, as the setting of some configuration parameters may end up modifying or undoing settings for other configuration parameters, such as where setting the Payment Card Industry (PCI) mode on an HSM may reset all other configuration parameters of the HSM. Attempting to ensure proper ordering and configuration for a distributed system of HSMs using existing approaches can be a complicated and error prone procedure, and can lead to delays and excess resource usage during such a procedure.

BRIEF DESCRIPTION OF THE DRAWINGS

Various embodiments in accordance with the present disclosure will be described with reference to the drawings, in which:

FIG. 3 illustrates an example message board including state information for various secure hardware devices in accordance with various embodiments.

DETAILED DESCRIPTION

Figure 1:
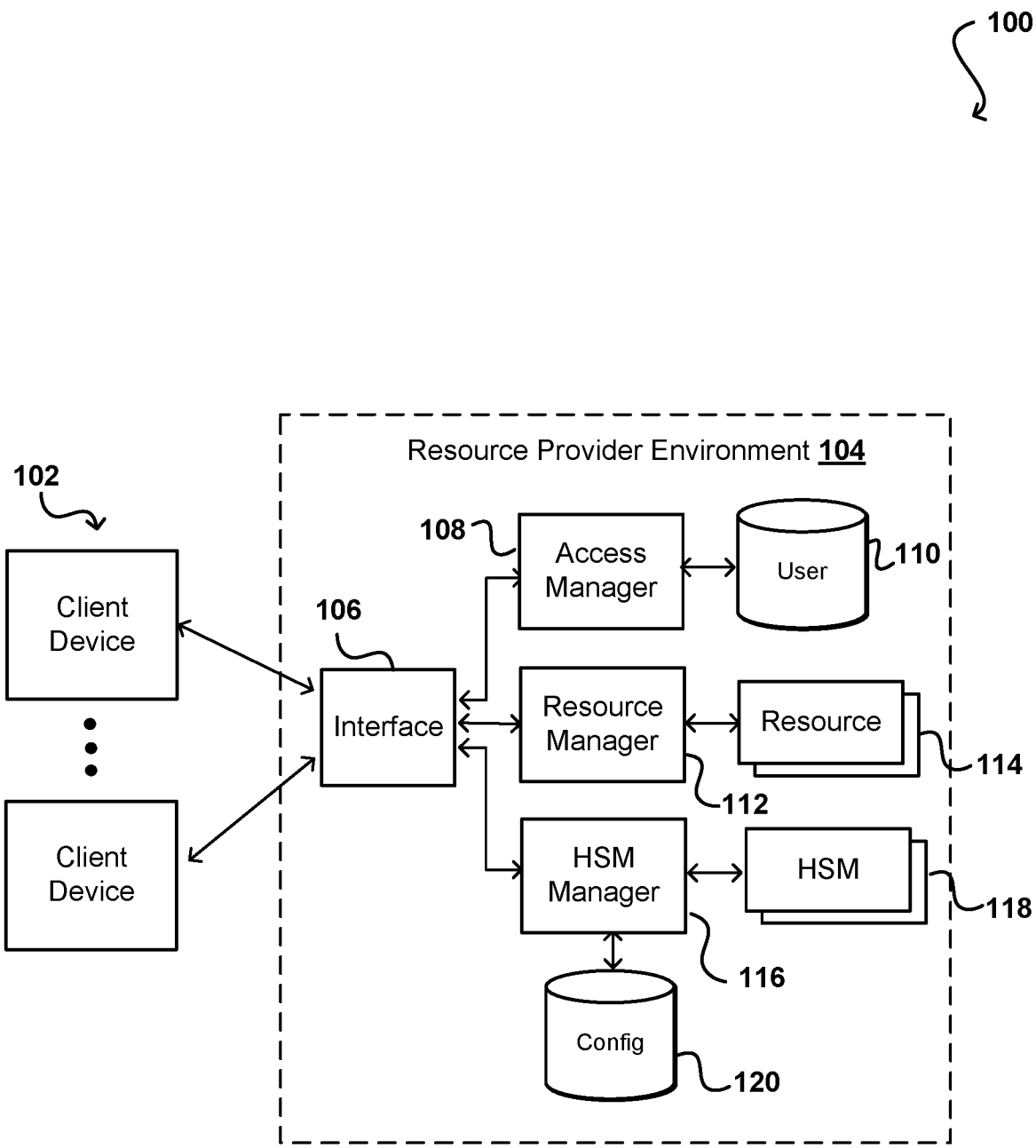
FIG. 1 illustrates a system to manage distributed hardware security modules that can be used in accordance with various embodiments.

Approaches described and suggested herein relate to the configuration of various computing or data resources. In particular, various embodiments can use a distributed set of independent services to configure different settings or parameter values for a secure hardware device, such as a hardware security module (HSM), without a need to determine or maintain a specific ordering of operation of those services, even when a given service may impact the settings of another service in the set. Configuration settings set by various independent services can include information about firmware versions or tamper states within the scope of various embodiments. In at least one embodiment, each service can attempt to set the appropriate configuration or parameter values for an HSM, and if successful can write an indication of the success, such as an indication of a healthy state, to a shared data store such as a message board. Each indication of state written by a given service can include a logical timestamp, such as a Lamport timestamp that is incremented from a last determined timestamp. A health service can monitor the state information reported by these various services to determine when all services have reported a healthy state with respect to a given HSM. To ensure that none of the settings were modified by another service since the reporting by an individual service, the health service can enter a wait state wherein the health service sets a high water timestamp to the current highest timestamp value for the HSM state data, and waits until all services have continued to report a healthy state with timestamps having values greater than the high water timestamp. In this way, it can be ensured that all services remain in a healthy state without being impacted by an operation of another service, and that the HSM is in an overall healthy state and configured as expected. The health service can then report the HSM to be in an overall healthy state, such that the HSM can be deployed and made available for use, such as by adding an address of the HSM to a domain name service (DNS) pool of available resources. After such deployment, the independent services can periodically check the configuration settings of the HSM and update the information written to the shared data store. If the health service, monitoring the data store, determines that the HSM is not currently in a healthy state, the HSM can be removed from availability and the independent services can attempt to reconfigure the HSM. Once the HSM is again in a healthy state, based on the individual state information and the timestamps for the individual services, the HSM can be returned to availability. Approaches presented herein can therefore provide for the state management of the initial configuration, continuous health monitoring, and/or updated configuration of HSMs and other physical or virtual secure devices. Additionally, state machine(s) selected for use can be relevant for the initial configuration, continuous health monitoring, and/or updating configuration of these or other such HSMs.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an example system 100 that can be used to provide security-related functionality to users, applications, clients, or other such entities according to at least one embodiment. In this example, there may be a number of resources 114 provided in a resource provider environment 104 that can be made available for use by various users. These resources may include any appropriate computing or electronic resources useful in a networked computing environment, as may relate to physical or virtual servers or compute instances, data repositories, and the like. Users may use various client devices 102 to engage in communications with these resources, such as by sending requests to be received by an interface 106 of the resource provider environment 104, where the interface can direct information for the request within the environment as appropriate. In at least one embodiment, information for a request will be passed to an access manager 108 that can compare information associated with a request against information stored in a user data repository 110, or other such location, to attempt to authenticate a source of the request and determine that the source is authorized to access various resources. Once authentication and authorization are verified, information for the request can be directed to a resource manager 112 to attempt to determine and allocate one or more appropriate resources 114 for serving the request. Once allocated, a request may be directed to an allocated resource instead of first being directed to a resource manager 112.

In some embodiments, a user may wish to perform a task that involves a secure operation relating to encryption or other use of at least one secret, such as a cryptographic key. This may require allocating a hardware security module 118 for use in storing the secret(s) and performing one or more related security tasks using the secret(s). These tasks can include, for example, performing encryption or decryption, generating a digital signature, or performing strong authentication, among other such tasks. In order to provide for enhanced security, different HSMs 118, or HSM instances, may be allocated to different users, or groups of users. An HSM manager 116 can cause an appropriate HSM to be allocated for a user or request as appropriate. Once allocated, an HSM 118 can store one or more secrets for users to which that HSM was allocated, and can use these secrets with a crypto processor to perform requested security-related tasks or operations.

The HSM manager 116 in this example system can be responsible for ensuring the appropriate configuration of each HSM. As mentioned, the HSMs may be required to be configured in a specific way along a number of different dimensions, as may relate to permissions, users, firmware, behavior, and certificates, among other such options. This may include ensuring that each HSM is configured in the same way, or that each HSM corresponds to a specified configuration, which may be different for different HSMs or HSM instances. The configuration may involve various types of parameters, as may relate to permissions, settings, or firmware, among other such options. Also as mentioned above, the HSM manager 116 can be responsible for ensuring that the setting of a configuration parameter, or set of configuration parameters along a given dimension, does not inadvertently modify the settings for one or more other configuration parameters, such that the HSM ends up not having all desired configuration parameter values.

Figure 2:
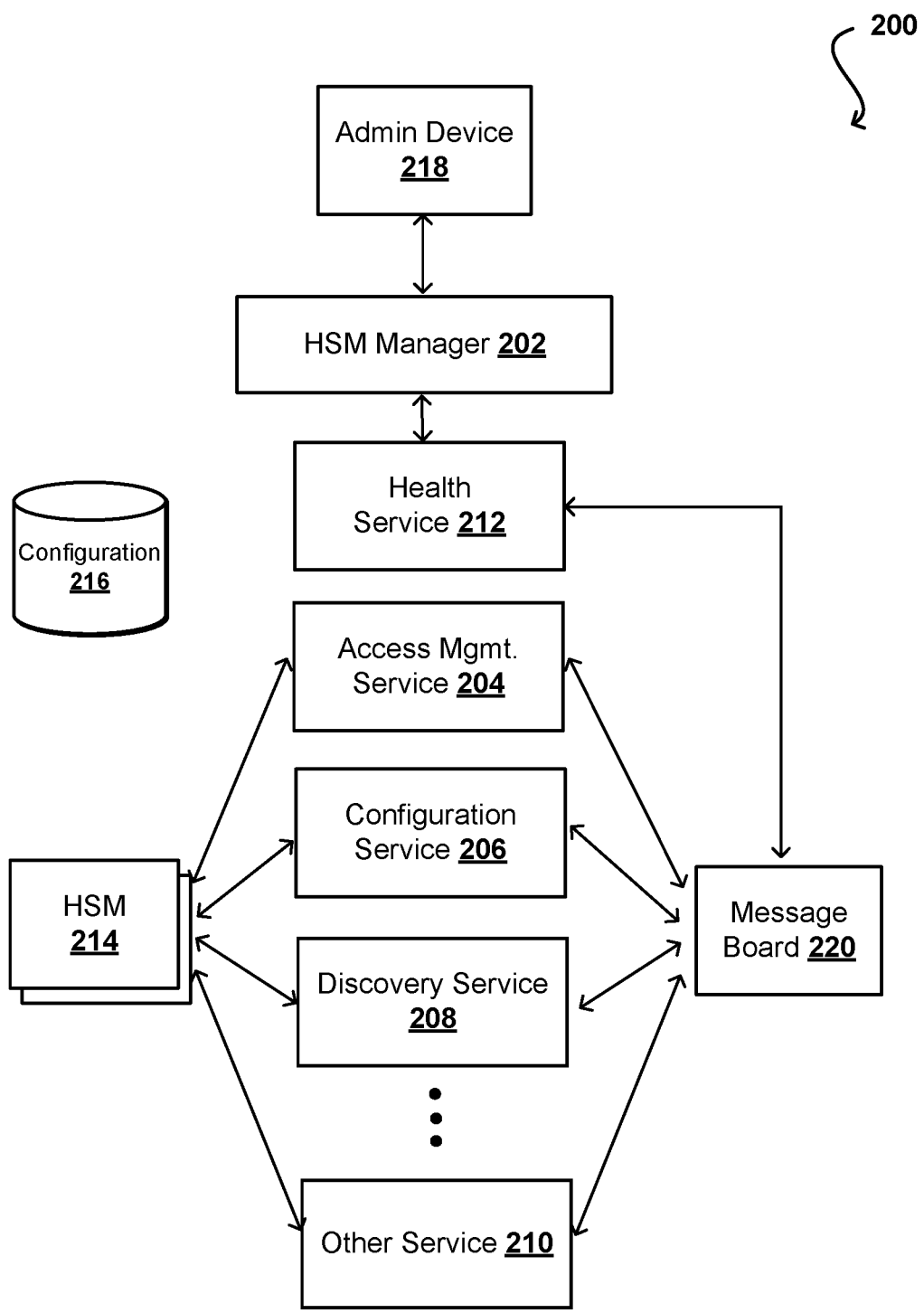
FIG. 2 illustrates system including a set of independent services to configure hardware security modules that can be used in accordance with various embodiments.

In at least one embodiment, a system 200 such as that illustrated in FIG. 2 can be used to ensure proper values for all configuration settings for an HSM, or other such security-related device, before that HSM is deployed, allocated, or otherwise made available for hosting secrets on behalf of one or more users. In this example, the configuration settings 216 may be specified using a number of separate and independent services. An HSM manager 202, such as is described with respect to FIG. 1, can be responsible for the coordination of these individual services, which can each configure settings for a specific, respective dimension of the HSM. This may include, for example, a microservice 204 for configuring permissions and access management, another microservice for general configuration 206, another microservice 208 for managing discovery settings, and one or more other services 210, as may relate to firmware configuration or other such dimensions. These microservices can each run on an interval to configure a specific dimension of a given HSM 214 of a set of distributed HSMs. In some embodiments, the HSM manager 202 may utilize a coordination microservice, referred to herein as a health service 212, that operates in much the same way but does not configure any HSM. In at least one embodiment, each individual service setting configuration parameters for a given HSM can write information to a shared location, in this example referred to as a message board 220, although any appropriate log, file, shared data store, or repository can be used in various embodiments. The health service 212 can read the information in the message board 220 with respect to a specific HSM 214, or set of HSMs, to determine whether the configuration is properly set and an HSM is ready for deployment. The health service 212 can then communicate with the HSM manager 202 to indicate whether a given HSM is properly configured and ready for use.

As mentioned, however, the setting of configuration parameters for various HSM deployments may need to be performed in a specific order in order to avoid overwriting or undoing prior parameter settings. If a set of independent services is to be used, there may be no guarantee as to the ordering of various settings among these services, particularly when these services may act concurrently or at least partially in parallel as part of a distributed system. In at least one embodiment, each of these services can write information to the message board 220 indicating that the relevant configuration parameters have been set. As indicated, however, simply indicating that a service has completed configuration may not be sufficient, as another service could perform a setting or update that modifies that earlier configuration. In at least one embodiment, each service can provide a time stamp with the information written to the message board 220. These timestamps can be compared to attempt to determine whether the ordering of the settings by the various services might have impacted the configuration set by any of the other services. Such an approach may not be ideal, however, as physical timestamps can be insufficient in various distributed systems to conclusively determine when specific events occurred, as well as if those events occurred or occurred more than once. For example, different services might be run using different resources with different reference clocks, and those clocks may not be completely synchronized. Further, there may be latency or other issues that might impact the accuracy of the clock-based timestamps.

Accordingly, approaches in accordance with various embodiments can use timestamps that can be more reliable in determining the ordering of configuration settings, or other such operations, performed by a set of independent services. In at least one embodiment, a specific type of "logical" timestamp or acknowledgement can be utilized that provides at least a partial ordering of tasks performed by various services. Each service can write information to a message board 220 indicating that a configuration update for a specific HSM was completed successfully (e.g., verified), and with that information can include a logical timestamp. A logical timestamp can take the form of a Lamport timestamp, for example, where each Lamport timestamp is determined with respect to the maximum Lamport timestamp that was previously reported by any of the independent services, at least with respect to a specific HSM. In at least one embodiment, a service can read the maximum Lamport timestamp from a message board and can increment that logical timestamp, such as to add 1 to the value for a monotonically increasing set of timestamp values. After attempting to set a respective subset of configuration parameters for an HSM, the service can attempt to determine whether the configuration parameters were be able to be set properly and, after setting completion, represent the expected values. If all respective configuration parameters are verified to have the expected values, then the service can report such verification results, such as by indicating that the configuration parameters for the HSM from that service are in a "healthy" state. If one or more configuration parameters are not in the expected state, or if there is another problem detected by a given service, then that service can report that the respective configuration parameters are in an "unhealthy" state. Along with these state reports, the service can also transmit the corresponding Lamport timestamp that was determined for the service by incrementing the maximum prior Lamport timestamp indicated in the message board 220.

The health service 212 in such an embodiment can check the entries from the various services in the message board to determine whether all the services have reported a "healthy" state. The health service can also analyze the respective logical timestamps provided by each service to determine whether those healthy results can be relied upon based, at least in part, upon the ordering of operations identified by the logical time stamps. For example, one can consider services A and B where service B will cause the settings from service A to be reset. Accordingly, to ensure that all configuration parameters have been set properly, service A should execute after service B. If just relying on healthy state information, if service A executes first followed by service B, and each reported a healthy state when those services execute, there would be no indication that the parameters set by service A have been modified by service B, and that service A would likely report an "unhealthy" state based on the current values.

By analyzing the logical timestamps for each state entry in the message board 220 for a given HSM, the health service can provably determine which services performed or completed configuration after which other services with respect to that HSM. In at least one embodiment, the health service identifying healthy state reports from all services for an HSM configuration may enter into a wait state or similar operational mode. When entering into a wait state, the health service can determine a partial ordering of the services based on the Lamport timestamps, and can determine that each of these services logged a healthy state, but the health service cannot ensure that the healthy state or status from a given service has not become stale, or no longer reliable or accurate. During a wait state, the health service can take the logical timestamp from the most recently run service at set that value as the high water timestamp, or the timestamp corresponding to the most recent service update that corresponds to the only set of configurations that can be reliably determined to be in the healthy state. By being the most recent service to have completed, no other service could have run and modified the settings of this most recent service (except in the case of non-received messages or corrupt message board data, for example, among other such potential situations).

In at least one embodiment, each service may periodically check the health of an HSM, at least during the configuration stage, as part of a configuration loop. For each iteration, the service can check the message board 220 for the most recent logical timestamp and increment to a new timestamp. The service can then check, and report on, the health of the respective configuration parameters. The health service, during this wait time, can check to see whether all services reporting with logical timestamps after, or higher than, the high watermark timestamp reported a healthy state or status. If all other services report a healthy state after the high watermark timestamp then the HSM configuration can be determined to have converged to a steady state, and can be trusted to have all accurate or as-expected values. If, however, at least one of the services reports an unhealthy state or status, then it can be determined that the HSM is not ready for deployment. Under normal conditions, services detecting an unhealthy state of their parameters can attempt to reset those values, and services where things are in a healthy state do not need to make any changes, and thus will not unconfigure any parameter values set by other services. After another round (or small number of rounds) of iterations, all services should report as healthy, or report as not having made a change since the last healthy report, and the health service 212 can again determine a high water timestamp and enter a new wait period (or continue in the same wait period or state) to determine whether the HSM configuration has converged to a steady state. If, after a period of time or number of iterations, the configuration does not converge to a steady state then the HSM can be flagged for analysis and/or the configuration process can be analyzed to determine whether there is a bug in at least one of the services, among other such options. Such an approach can ensure that proper configuration values are set by independent services without a need to control ordering of those services. Such an approach can also help to reduce the number of bugs or other performance issues with respect to hard coding of order enforcement for multiple services that may change over time. Such an approach can also help to reduce the amount of coding and processing overall, which can reduce compute and storage cost.

Once an HSM is determined to be in a steady state, the HSM can be deployed and used for storing secrets, such as cryptographic keys, and performing security-related operations using those secrets. After deployment, the health service 212 (or a different health service) can monitor the overall global health state of a set or pool of HSMs. In at least one embodiment, the various services can analyze the configuration parameters to determine whether an HSM has become misconfigured, or is no longer up-to-date given some updates that may have happened in the background, among other potential options. Upon such determination, the service can report an unhealthy state and store that information to the message board 220 or another such location. The health service 212 can monitor the message board for recent unhealthy messages, and can determine that the HSM overall is not currently in a healthy or steady state. In response, the health service 212 can take action, such as to remove that HSM from availability, such as by removing the HSM from a DNS pool until the HSM is again in a steady, healthy state. In at least one embodiment, the HSM can cause any secrets stored by that HSM to be securely transferred and stored to at least one other HSM, such that those secrets (and associated functionality) will not be unavailable once the unhealthy HSM is taken offline. The HSM can go through the configuration process as discussed previously, and if the HSM is able to be properly configured in a steady state then the HSM can be returned to use, such as by being added back to the HSM pool. If the HSM is unable converge to a steady healthy state, or if the HSM has had repeated issues with improper configuration that were not experienced by other HSMs, the HSM can be removed from the system and replaced or repaired as appropriate.

A health service 212, or equivalent system, service, device, or process, can function as a type of logically centralized state machine. An HSM manager can indicate to the relevant services (or at least a service manager) that an particular HSM (or group of HSMs or other secure hardware devices) is to be configured. The HSM manager may also communicate this information to the health service 212, or the health service 212 can learn about the newly-configured HSM through monitoring of the message board 220 or other such data repository, as health status messages for the HSM(s) will begin to appear corresponding to the various configuration services. The health service 212 can work with the HSM manager 202 to ensure that a sufficient number of HSMs, or amount of HSM capacity, is available at any time with steady configuration state, including potentially some excess capacity to handle additional requests or allow for transfer from misconfigured or malfunctioning HSMs. The use of the health service can help to ensure that sufficient capacity is available in the event of a service crash, failed write, hardware failure, or other such issue affecting one or more deployed, or to-be-deployed, HSMs. Such a distributed state machine can also help to allow each service to operate entirely independently, concerned only with configuring an HSM for the relevant parameter values or settings without a need to care about ordering or overwriting of configuration values, etc.

In one example, a shared message board 220 can at least temporarily store the current state and Lamport timestamp for each service, where the state information for each service can be individually updated. In this example, the state of each service can be considered one of healthy or unhealthy, among other such options. The states can reflect whether or not all relevant configuration parameters or settings have the current expected values. On each run of a given microservice, the service can write a new Lamport timestamp and a new service state to the shared message board. The new Lamport timestamp can be calculated as the maximum value of all Lamport timestamps currently in the message board, incremented by one. The new service state can indicate whether or not a specific HSM is configured properly, given the specific dimension the microservice intended to configure. A coordination microservice, such as a health service 212, can read the shared message board 220 on an interval (or in response to an update or new message, etc.) to determine whether or not a given HSM is fully configured. This process can include, for example, determining that an HSM is not fully configured if any service is reported as Unhealthy. In that case, the health service can mark itself as Unhealthy, at least with respect to that particular HSM. If all individual services have a state of Healthy, and the health service 212 has a state of unhealthy, the health service can mark itself as being in a wait state. During the wait state, the health service can store a number which is the new Lamport timestamp (with the same calculation as above), which can be thought of as the High Water Lamport Timestamp. If all services have a state of healthy and a Lamport timestamp equal to or greater than the high water Lamport timestamp stored by the health service, and the health service is in a wait state, then the HSM can be determined to be fully and properly configured, and can be used in production. Such an approach can use the partial ordering provided by Lamport timestamps, as well as the high water Lamport timestamp, to guarantee that all microservices have checked the configuration dimension they are concerned with after any modification has been made to the HSM. Such an approach can help to prevent the HSM from being considered fully configured if the run order of microservices has a dependent service run before the dependency service.

In at least one embodiment, each individual service can operate on a continual control loop. For each loop, a service can check an HSM to determine whether the setting(s) the service cares about are correct or not. Using a firmware service as an example, the service can check the HSM to determine whether the HSM has the correct firmware. If the HSM does not have the correct firmware, that service will report to a shared data store, such as a message board or table in a distributed database, indicating that the current setting (e.g., firmware version) is not correct. The service in at least one embodiment can report that this particular HSM in an "unhealthy" state, and that a setting, configuration, or other such aspect of the HSM likely needs to be updated. If the firmware is correct and up to date, the firmware service can report the HSM as in a "healthy" state. While in some embodiments the service would not need to report for each loop unless there is a change in state, to conserve transmission bandwidth, transmitting a healthy state with a timestamp can help to ensure that the service is properly performing checks at the appropriate times or intervals, and that the HSM firmware is current based on the shared data store including a healthy state report with a recent timestamp (logical or otherwise). Once all these services report their respective states as healthy, it can be determined that every configuration parameter that is important for an HSM is correct, and the HSM is in an overall healthy state, and if not yet deployed then it can be determined that the HSM is operational and production ready. If the HSM is already in production, then it can be determined that the HSM is still in an overall healthy state and can remain in production. Such an approach can also be used to ensure that HSMs have the correct settings after any appropriate configuration, firmware, or other such updates that may occur after (or while) the HSM is placed into production.

In at least some embodiments, a service may report an HSM being in a healthy or unhealthy state for additional reasons as well. For example, a service might report that an HSM is in a healthy state if the HSM is free of detectable errors or tampering that may be independent of configuration settings. A service might also report an HSM (or other security device or mechanism) as being in an unhealthy (or potentially unhealthy) state in response to any issue being identified that might prevent the HSM from being production ready and/or serving production traffic. In addition to an outdated or incorrect firmware or configuration setting, a service might report an HSM as being unhealthy if there is a determined loss of connectivity, a reported error or data corruption, or if there is evidence of potential tampering. In many instances the services will report on the health of a physical HSM, but in at least some embodiments a service can perform health checks and reporting for at least one virtual HSM running on a physical HSM (or other secure hardware).

In one example deployment, there can be around eight services that can communicate directly with HSMs. The specifications, selections, number, and tasks of such services can vary between embodiments. While for the most part the various services will operate independently of each other, there may be various interactions between them. For example, as discussed above a health service can rely on the relative health of other services, such as a firmware service, tamper service, configuration service, and discovery service. An access management service can first create accounts and roles on an HSM before these other services can perform their operations with respect to this HSM. A firmware service may update the firmware, which can reset the configuration on the HSM in at least some embodiments, affecting the status of the configuration service implicitly. Approaches as presented herein can provide for the state management of the initial configuration, continuous health monitoring, and updated configuration of the HSMs. Additionally, the state machine(s) selected for use can be relevant for the initial configuration, continuous health monitoring, and updating configuration of the HSMs.

There may be various constraints present in such a system. For example, when working in a distributed context, the state machine(s) should be tolerant to service failure, tolerant of network delays, and idempotent, such that its functionality with respect to an HSM can be executed several times without changing the final result beyond that of its first iteration. It can be desirable for such a system to be relatively simple to implement and operate over time. For at least security purposes, an unhealthy HSM should never be added back into production, such as by being added to a DNS pool. Further, an action that is likely to result in an HSM being unhealthy should not be taken if an HSM is currently in the DNS pool. An unhealthy HSM in the DNS pool should be removed from the DNS pool as quickly as possible. The state-machine governing the HSM lifecycle should always attempt to make progress towards a healthy HSM, and if unable should generate an alarm or notification, or perform another such action to move toward remediation.

An approach in accordance with at least one embodiment can use a centralized state machine instead of a distributed state machine. Using a centralized state-machine governing the various steps that need to occur, an HSM an start out in a "new" state, for example, and the configuration and setup process steps can be performed, and after each step the state of the HSM can be updated. This can include determinations that the appropriate accounts are established, the firmware is up-to-date, and that the HSM is configured as expected. Once the process has run through all of the steps, the HSM can be determined to be in a healthy state. A potential downside to such an approach, however, is the complexity of managing a large state-machine. While the happy-path of setting up an HSM may be relatively straightforward, as it involves executing a series of predetermined steps, it is also important to consider that errors may occur. In such instances, it may be necessary to determine how retries are handled by the system, such as whether they are to be handled by services, or by the centralized state machine. The issue can be more complicated if the retries may need to occur across multiple services, in which case the retries may need to be handled by the state-machine, which can involve more states and edges to consider and maintain.

A naive implementation of a state-machine in such an approach might also have poor transitions between states in the case of errors, losing information about the system in case debugging is to be performed. If a bad firmware update causes a tamper, should the HSM be reported to be in a "tamper" state or a "firmware_update_failed" or similar state? While a tamper state may be determined to be more critical, a firmware_update_failed state can be more useful when attempting to determine why the HSM is unhealthy. In some instances separate state can be created for specific errors or occurrences, but this increases the complexity of the system. There may be a number of such state conflicts to be considered and/or addressed. While a centralized state-machine may appear to be relatively simple conceptually, it brings complexity in terms of the actual state-machine to be coded and managed. Such a large state-machine may also increase the chances of introducing a bug or a bad state transition.

Accordingly, in at least some embodiments it may be beneficial to utilize a distributed state machine as disclosed herein. In the lifecycle of the HSM there can be multiple, independent aspects of the HSM to be configured, and these aspects can be managed both independently and concurrently. Rather than using a single state-machine and a single set of transitions, a distributed state-machine can be used where individual services keep track of its own, individual state independently from the other services. Only when each service is in a healthy state governed by its individual state-machine is an HSM considered to be in an overall healthy state. In at least one embodiment, each service can run a control-loop comparing the actual HSM configuration to a desired HSM configuration, as may be stored in a configuration data store or other such location. Individual services can continually execute its control-loop, and if any differences are found a service can make changes to the HSM following logic that is specific to that service. Rather than providing an imperative update for the configuration instruction, for example, a declarative command can be issued indicating what the configuration should be, and a set of operators can run a control-loop to fix any identified discrepancies between the actual and the desired state.

In one example, a series of pre-defined steps would need to be performed by a centralized state machine where an access management service is run before a configuration service, such as by the centralized state-machine or with an API call. If the services are instead treated as independent services with individual state, the access management service is constantly running checking whether or not the HSM has the correct roles and accounts, and makes corrections as necessary. The configuration service can be running continually, checking whether the HSM has the right configuration, and can also make correction as necessary. The configuration service may have difficulty initially, since the access management service needs to run to set up the roles for the configuration service to use, but once the access management service has set up its portion of the HSM successfully, the configuration service can make progress towards a healthy HSM. While the effect may be the same, an access management service can perform setup of the roles and accounts, and the configuration service can run after that to set up the configuration, but there may be no code or logic that explicitly makes that the case. The configuration service can fail repeatedly on a "no role or account" error, or similar state, until the account is set up, and then the configuration service can make progress. The relationship between the access management service and configuration service can be handled automatically by a distributed state-machine without having to explicitly declare the order in which they run, or ensure that the ordering is followed in all cases. Being able to avoid writing and maintaining such code can help to reduce the complexity of the services, as the configuration service does not need to care about the failure of the access management service, and vice versa.

In another example, there may be situations where updating the firmware using a firmware service might erase at least some of the configuration parameter values set by a configuration service. With a distributed state machine in place, such erasure is not critical as the configuration can detect during the next loop or iteration that the values were erase and can reset the appropriate values. If a firmware update on an HSM does not erase the configuration on the HSM, the configuration will detect that the values are as expected during the next loop or iteration, and will not need to make any changes. In either case, the system can automatically handle the situation, without a need to write or maintain any branching logic. Error-handling and debugging can also be simplified using a distributed state-machine instead of a centralized state machine, as there can be separate states for each aspect of the HSM. If a bad firmware update causes tamper, the firmware service would be in a "firmware update failed" or similar state, and the tamper service would be in a "tamper" state, and there would be no loss of information on the state of the system as a whole. Each separate state-machine is smaller than a centralized state machine, and is easier to correctly write and update since there can be far fewer edges to consider.

In at least one embodiment, a distributed state machine can be used with separate registers. A separate, dedicated column in a database table can be used for each service used to store the state of that specific service. The "distributed" state machine means that each service maintains a notion of its own state in the table, and has its own state machine which may or may not be partially dictated by the state machines of other services. The use of "separate" registers in this example means that each service can have its own dedicated write location which other services can read from, but to which these services are unable to write. Other approaches to implementing a distributed state machine can be used as well, but may require more technical knowledge and/or resources to implement.

The table 300 in FIG. 3 illustrates an example database table for an HSM according to at least one embodiment. There may be more services used than are illustrated in the table for simplicity of explanation. This table illustrates various states that can be exhibited by a distributed state machine. According to the first row, an HSM corresponding to SN 0000 is considered to be in a healthy state, since each relevant service (e.g., discovery, firmware and configuration) is also in a healthy state. The health service can provide the overall or "ultimate" state of the HSM, and is effectively an "AND" of the individual state machines, with healthy being the current values or states of those state machines. On the other hand, HSM SN 0001 is in an unhealthy state, since the configuration service is in an "updating" state. HSM SN 0002 is in an unhealthy state, since the firmware service is in a "needs_update" state. HSM SN 0003 is in a wait state, which is a special state described in more detail elsewhere herein. HSM SN 0004 is in an unhealthy state, since the discovery service has not yet received a DHCP request yet, and each other service in turn is unhealthy as well, since they have no connection. HSM SN 0005 is a virtual HSM, which is handled no differently from physical HSMs in terms of the overall strategy. Each service can operate differently depending whether it is a physical HSM or a virtual HSM. For instance, a configuration service would set the image on the virtual HSM rather than configure anything, but it is effectively treated independently from the physical HSM.

Each service can run a small state-machine specific to the operation of that service. The state of each service can be stored to a message board or database table in the specific "register" (or column) that is specific to that service. The health service can be a final gatekeeper for whether or not an HSM is in an overall healthy state. The health service may run no differently from the other services, using a constantly running control-loop, except instead of querying the HSM directly for configuration changes the health service can query the registers or columns of the other services to determine whether those services reported being in a healthy state or not. If all services AND together as healthy, and the logical timestamps indicate that none of these heathy states may be stale based on subsequent updates by another service, then the HSM can be determined to be in a healthy state and deployed, such as by being added to a DNS pool. Once a configuration service has completed configuring an HSM, the configuration service may configure one or more virtual HSMs on the configured physical HSM, and may insert new rows in the database table for each virtual HSM. These new rows can be detected by the various services, and the same control-loop operation can occur with respect to these new rows, although there may be some differing logic in certain services, such as where an image is to be installed to a virtual HSM and less configuration needs to occur. Increasing the number of virtual HSMs does not require any additional logic outside specifying and tracking the number of virtual HSMs created.

In at least one embodiment, a timestamp field in each column can correspond to a logical timestamp, such as a Lamport timestamp, providing a partial ordering of events. A wait state of the health service can rely on a Lamport timestamp to ensure that the services have converged before officially going into a healthy state and adding the HSM to a DNS pool. The value of the timestamp field can be an easy to determine and understand value. As discussed above, on every loop of a service, that service will take the maximum timestamp for each column in the row it is operating on, increment the maximum timestamp by one, and use this new incremented timestamp value when writing to the data table. There can be a "handshake" or similar action performed for knowingly going into an unhealthy state. For instance, if a firmware service discovers that the firmware version does not match the version intended to be in place on an HSM, it may be undesirable to immediately update the HSM, such as where the IP address of the HSM is still present in the DNS pool. In such instances, the firmware service can be caused to "handshake" with the health service to go into an unhealthy state, and remove the HSM from the DNS, before updating. This can be accomplished in at least one embodiment by causing the firmware service to enter a "to update" or similar state, with the health service then entering an unhealthy state upon detection. In at least one embodiment, a strongly-consistent read on the data table may be required.

Figure 4A:
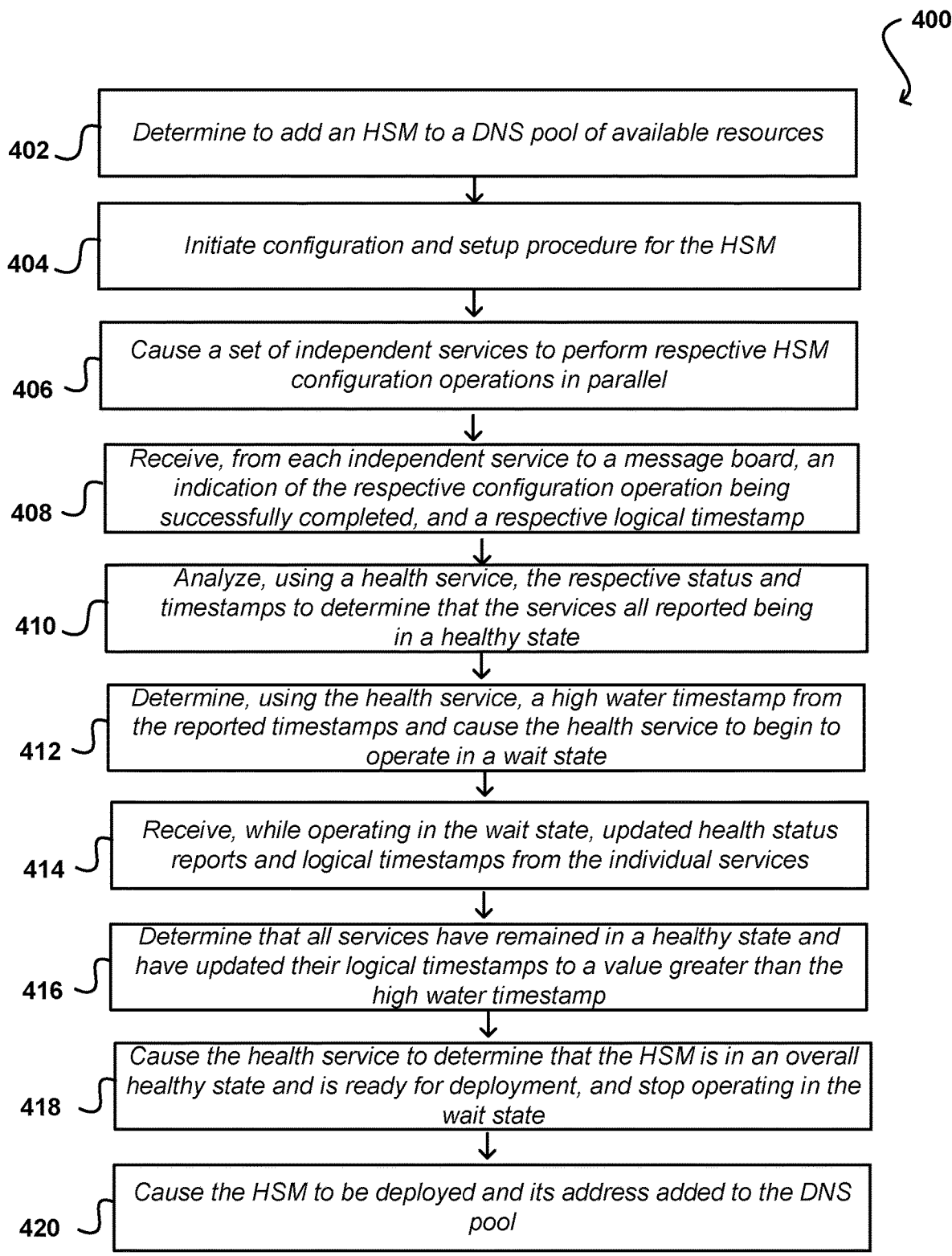
FIGS. 4A and 4B illustrate portions of an example process for configuring an HSM for deployment, and maintaining health of that HSM during deployment, that can be performed in accordance with various embodiments.
Figure 4B:
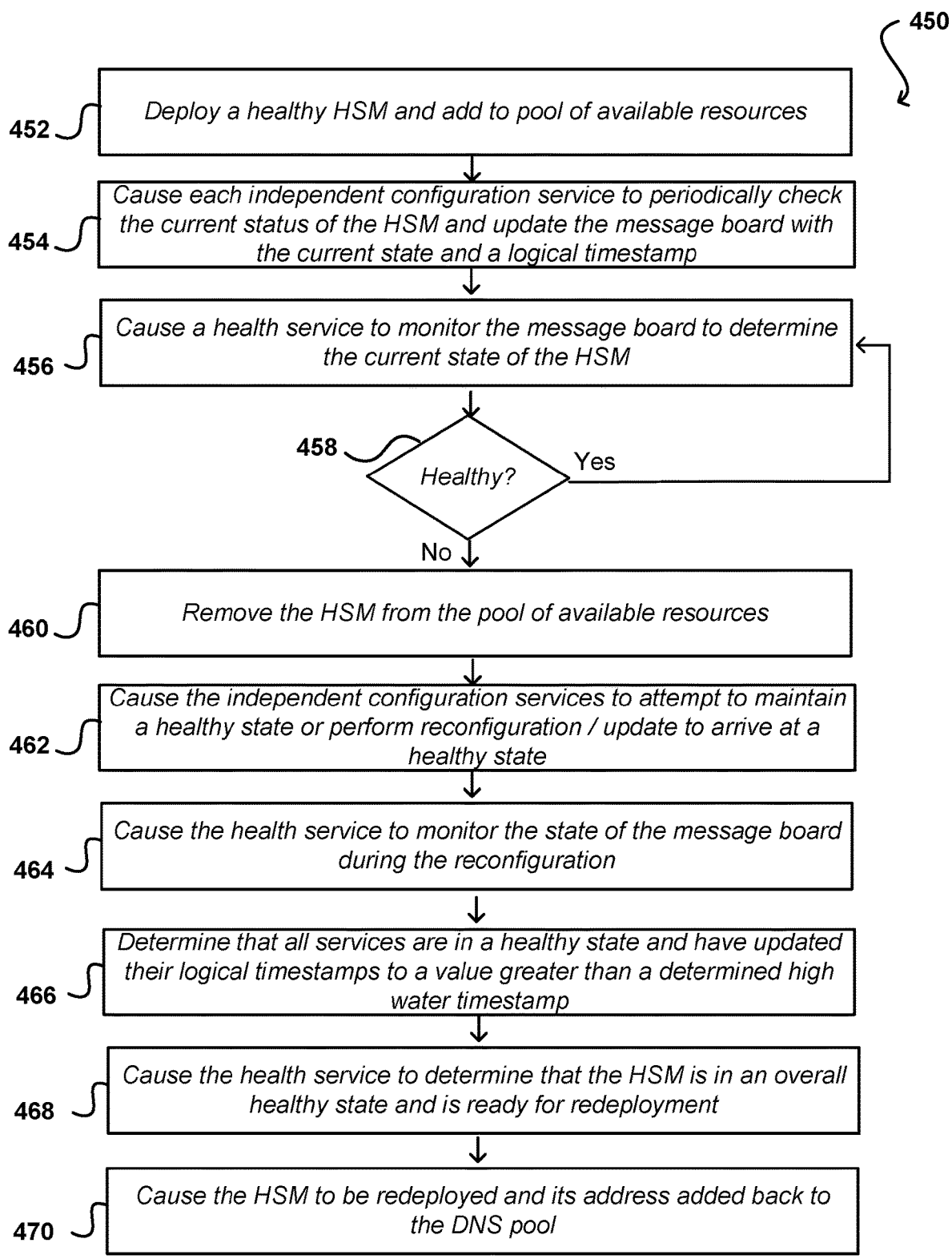

FIGS. 4A and 4B illustrate, respectively, portions of an example process for configuring a secure hardware device for deployment, and maintaining the health of the device during deployment, that can be used in accordance with at least one embodiment. It should be understood that for this and other processes discussed herein that there may be additional, fewer, or alternative steps performed in similar or alternative orders, or at least partially in parallel, within the scope of the various embodiments unless otherwise specifically stated. Further, although this process is described with respect to hardware security modules, such approaches to configuration management may be used for other types of physical or virtual devices as well in accordance with at least one embodiment. In the example process 400 of FIG. 4A, it is determined 402 that a secure hardware device, such as a hardware security module (HSM), is to be added to a pool of available resources, such as by making the HSM available and adding an address of the HSM to a DNS pool, among other such options. Before the HSM can be available for deployment, however, a configuration and setup procedure is initiated 404. As part of this procedure, a set of independent services can be caused 406 to perform respective HSM configuration operations in parallel, or at least not in a determined order or sequence. The independent services can run on a continual (or other regular or irregular) control loop in at least one embodiment, where "causing" the services to perform respective operations can include providing or making available some type of indication of HSM availability or configuration required such that the services will process data for a specific HSM, or other secure hardware device, on a next iteration or run through the control loop.

The set may include various types of services, such as (without limitation) a configuration service, a permissions and access management service, or a discovery service, as well as other services as appropriate. Each service can attempt, over one or more iterations or passes through a control loop, to properly configure the parameter values or settings for the HSM for which that service is responsible. In response, an indication can be received 408 from each of the individual services to a message board, or other shared data store, that indicates that the respective configuration operation was completed successfully, as may correspond to that service reporting a healthy state. A logical timestamp can also be received with each indication received from a service, where that logical timestamp can be a Lamport timestamp that was incremented (such as by adding a value of 1 to a current or most recent timestamp value) and provided as an indication of timing of the reporting from the various services.

During the configuration process, a health service can analyze 410 the respective status and timestamps to determine that the services have all reported being in a healthy state with respect to the HSM. If one or more services have not reported being in a healthy state, then the health service can wait until all services report being in a healthy state (or otherwise indicating that their portion of the HSM configuration settings have been verified to be in the expected state or have the expected values). If one or more services have not provided an indication of a healthy state within a maximum length of time or maximum number of configuration attempts, then the HSM might be removed from the configuration process and flagged as having a configuration issue, which may be indicative of a problem with the HSM or a compatibility issue between the configuration values or services, among other such options.

Once the health service has determined that all services have reported being in a healthy state, the health service can determine 412 a high water timestamp from the reported timestamps of the services from the message board, where the high water timestamp can correspond to the logical timestamp with the highest value associated with the HSM in the message board. The health service can then begin to operate in a wait state, or similar operational mode. As discussed herein, a wait state can be used when all services have reported as healthy, but there is a need or desire to ensure that none of the configuration values set by these services were overwritten or altered as a result of operation of any of the other services with respect to the HSM. While operating in the wait state, updated health status reports and logical timestamps can be received 414 from the individual services. Each service can perform additional configuration setting or verification operations as part of an iterative process or control loop, and if any configuration settings are determined to be no longer correct during any of these iterations then the service can attempt to set and verify the settings or values, and if all are again correct then the service can report a healthy state and provide an updated timestamp corresponding to this most recent operation. If, during an iteration, a service determines that all respective settings or values are as expected, and the service is in a healthy state, then the service can either write a new heathy status update to the message board with an updated timestamp, or can keep the healthy state information in the message board or shared data store, and update the corresponding timestamp, among other such options.

The health service can analyze the information from the various services in the message board to determine 416 when all services are reporting as being in a healthy (or similar) state, and that the timestamps reported for each service all are greater in values than the high water timestamp, indicating that those services have remained in a healthy state after a most recent iteration performed by each service and thus have not been overwritten or undesirably modified. The HSM can then be determined to be in an overall healthy state where all configuration settings and parameter values are in the expected state. The health service can then be caused 418 to stop operating in the wait state since the HSM is ready for deployment. The HSM can then be caused 420 to be deployed, and made available by adding its address to a DNS pool, or other such availability option.

FIG. 4B illustrates a second example process 450, or second portion of an example process, for managing the configuration of a secure hardware device, such as an HSM, during deployment and availability. In this example process, an HSM can be determined to be in a healthy state, such as by using a process such as that described with respect to FIG. 4A, and can be deployed and added to a pool of available resources, such as may be part of a set of shared resources offered through a resource provider environment or other multi-tenant environment. The healthy state of the HSM can have been determined using a health service that monitors a shared data store, such as a message board, for state information reported by a set of independent configuration services. While the HSM is deployed and available for use, each of these independent services can be caused 454 to periodically check the current state of the HSM, such as by checking that the respective configuration settings or parameter values correspond to the currently expected settings or values, and to update the message board with the current state and a current logical timestamp. The health service can be caused 456 to monitor the information in this message board to determine 456 a current overall state of the HSM based on the state information reported from these various services. If it is determined 458 that all services are still reporting a healthy state during deployment, then the overall state of the HSM can be determined to be healthy and the HSM can remain deployed and available, with the monitoring of the HSM state information continuing.

If, however, the health service determines that the HSM is no longer in a healthy state, such as where at least one of the services has reported not being in a healthy (or similar) state, then the HSM can be removed 460 from the pool of available resources so that it is not used for sensitive data until the HSM is again properly configured and operating as expected. The independent configuration services can be caused 462 to attempt to maintain a healthy state and/or perform a reconfiguration or update in order to arrive at a healthy state as appropriate. The health service can be caused 464 to monitor the state information for the HSM in the message board during the reconfiguration process, including analyzing the state information and timestamps reported by each individual service. During this monitoring, the health service can determine 466 that all services are reporting a healthy state and have updated their logical timestamps to values greater than a determined high water timestamp, such that each service has gone at least one iteration remaining in a healthy state after all services reported being in a healthy state. The health service can therefore be caused 468 to determine that the HSM is in an overall healthy state and is ready for deployment. The HSM can then be caused, such as by an HSM manager or resource manager, to be redeployed or again made available for use, such as by its address being added back into a DNS pool for available resources. If the HSM is unable to be placed back in a healthy state, then the HSM may be flagged for additional analysis and taken from a reconfiguration state to an offline or other such state. One or more remedial actions may then be taken, such as to analyze the HSM for defects or replace that HSM with another secure hardware device, among other such options.

Figure 5:
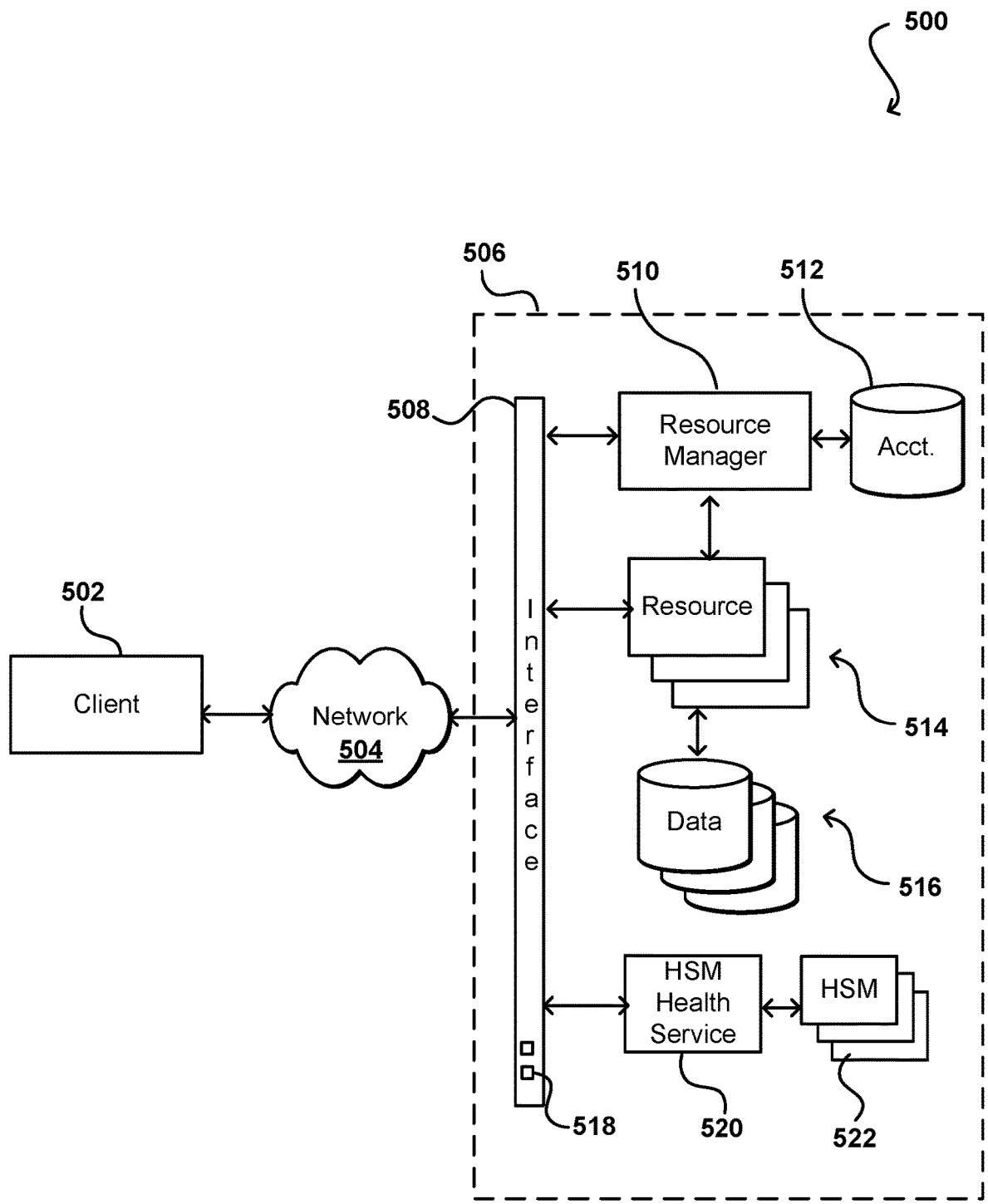
FIG. 5 illustrates an example network-inclusive computing environment in which aspects of various embodiments can be implemented.

FIG. 5 illustrates an example environment 500 in which aspect of various embodiments can be implemented. Such an environment can be used in some embodiments to provide resource capacity for one or more users, or customers of a resource provider, as part of a shared or multi-tenant resource environment. For example, the provider environment 506 can be a cloud environment that can be used to provide cloud-based network connectivity for users, as may be used during disaster recovery or network optimization. The resources may also provide networking functionality for one or more client devices 502, such as personal computers, that may be able to connect to one or more network(s) 504, or may be used to perform network optimization tasks as discussed herein.

In this example a user is able to utilize a client device 502 to submit requests across at least one network 504 to a multi-tenant resource provider environment 506. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 506 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces 518 enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

In at least one embodiment, resources made available for use by a client device 502 can include secure hardware devices, such as a set of hardware security modules (HSMs) 522. There may be a pool of domain name service (DNS) addresses corresponding to HSMs available for use, although certain HSMs may be configured for certain specific uses or functions. A health service 520 can be used as disclosed herein to ensure that the HSMs are properly configured or in a healthy state before being deployed, and can monitor the state of those HSMs during deployment to ensure that any HSM that is no longer in a health state is removed from the pool of available resources and reconfigured as appropriate. As mentioned, specific configurations may vary between HSMs, and there may be specific configuration settings or parameter values set for a specific client 502, application, or service. The health service 520 can work with a set of independent services that can ensure that the current or expected settings are in place on the respective HSMs.

Once a user (or other requestor) is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identity, specific address, or other such information that can enable the client device 502 to communicate with an allocated resource without having to communicate with the resource manager 510, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 6:
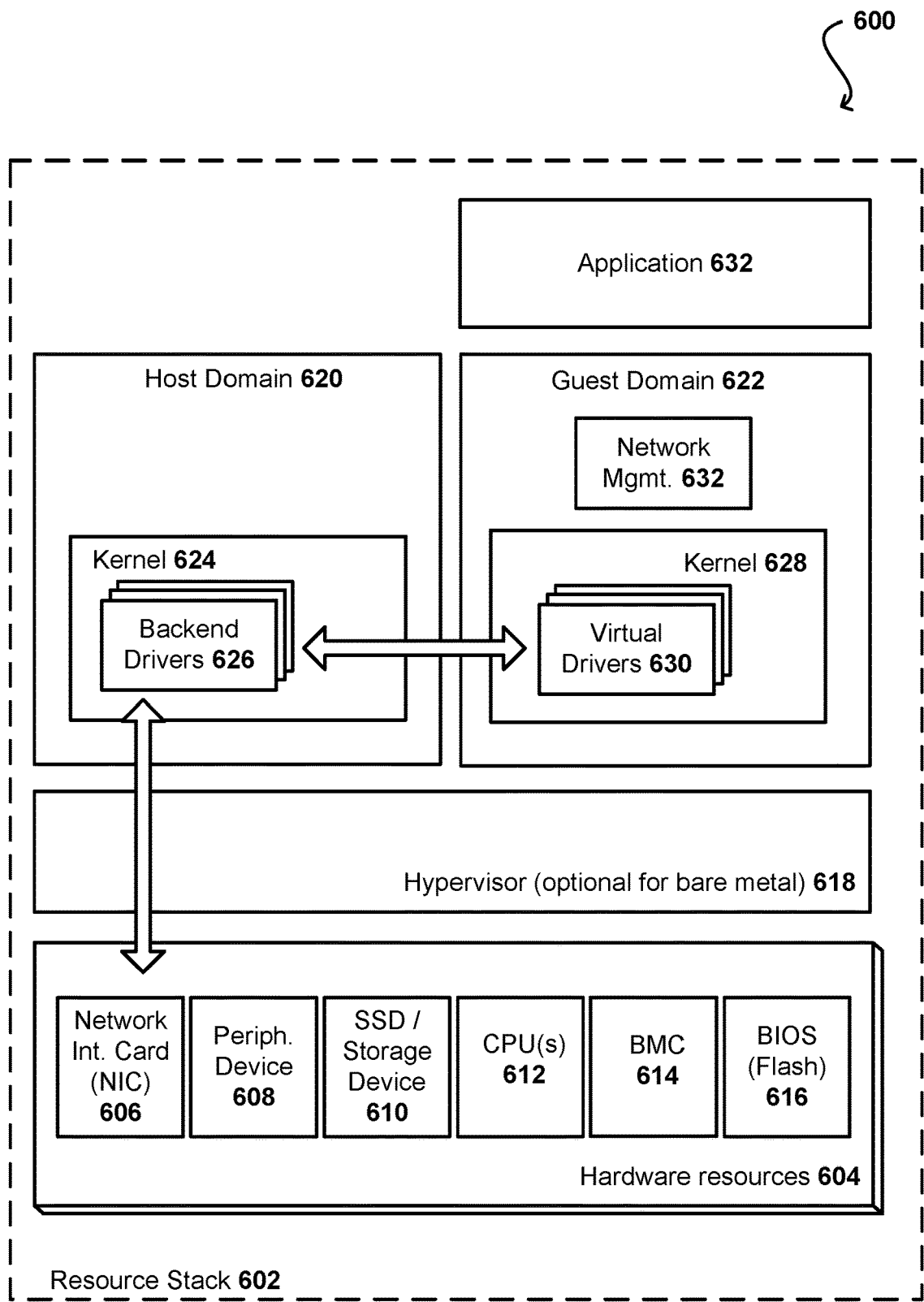
FIG. 6 illustrates example components of a server that can be utilized to perform at least a portion of a network management process, in accordance with various embodiments.

FIG. 6 illustrates an example resource stack 602 of a physical resource 600 that can be utilized in accordance with various embodiments, such as may be provided as part of a provider environment such as that illustrated in FIG. 5. When performing tasks, such as security-related tasks using a secure data application 632, for example, such resources can include components such as CPUs 612 for executing code to perform these tasks, NICs 606 for communicating network traffic, and memory for storing instructions and networking data. In some embodiments, an entire machine may be allocated for these tasks, or only a portion of the machine, such as to allocate a portion of the resources as a virtual machine in a guest domain 622 that can perform at least some of these tasks.

Such a resource stack 602 can be used to provide an allocated environment for a user (or customer of a resource provider) having an operating system provisioned on the resource. In accordance with the illustrated embodiment, the resource stack 602 includes a number of hardware resources 604, such as one or more central processing units (CPUs) 612; solid state drives (SSDs) or other storage devices 610; a network interface card (NIC) 606, one or more peripheral devices (e.g., a graphics processing unit (GPU), etc.) 608, a BIOS implemented in flash memory 616, and a baseboard management controller (BMC) 614, and the like. In some embodiments, the hardware resources 604 reside on a single computing device (e.g. chassis). In other embodiments, the hardware resources can reside on multiple devices, racks, chassis, and the like. Running on top of the hardware resources 604, a virtual resource stack may include a virtualization layer such as a hypervisor 618 for a Xen-based implementation, a host domain 620, and potentially also one or more guest domains 622 capable of executing at least one application 632. The hypervisor 618, if utilized for a virtualized environment, can manage execution of the one or more guest operating systems and allow multiple instances of different operating systems to share the underlying hardware resources 604. Conventionally, hypervisors are installed on server hardware, with the function of running guest operating systems, where the guest operating systems themselves act as servers.

In accordance with an embodiment, a hypervisor 618 can host a number of domains (e.g., virtual machines), such as the host domain 620 and one or more guest domains 622. In one embodiment, the host domain 620 (e.g., the Dom-0) is the first domain created and helps virtualize hardware resources and manage all of the other domains running on the hypervisor 618. For example, the host domain 620 can manage the creating, destroying, migrating, saving, or restoring the one or more guest domains 622 (e.g., the Dom-U). In accordance with various embodiments, the hypervisor 618 can control access to the hardware resources such as the CPU, input/output (I/O) memory, and hypervisor memory.

A guest domain 622 can include one or more virtualized or para-virtualized drivers 630 and the host domain can include one or more backend device drivers 626. When the operating system (OS) kernel 628 in the guest domain 622 wants to invoke an I/O operation, the virtualized driver 630 may perform the operation by way of communicating with the backend device driver 626 in the host domain 620. When the guest driver 630 wants to initiate an I/O operation (e.g., to send out a network packet), a guest kernel component can identify which physical memory buffer contains the packet (or other data) and the guest driver 630 can either copy the memory buffer to a temporary storage location in the kernel for performing I/O or obtain a set of pointers to the memory pages that contain the packet(s). In at least one embodiment, these locations or pointers are provided to the backend driver 626 of the host kernel 624 which can obtain access to the data and communicate it directly to the hardware device, such as the NIC 606 for sending the packet over the network.

It should be noted that the resource stack 602 illustrated in FIG. 6 is only one possible example of a set of resources that is capable of providing a virtualized computing environment and that the various embodiments described herein are not necessarily limited to this particular resource stack.

In some embodiments, the guest domain 622 may have substantially native or "bare metal" access to the NIC 606 hardware, for example as provided by device assignment technology based on an IO Memory Management Unit (IO-MMU) device mapping solution like Intel VT-D. In such an implementation, there may be no virtualization layer (e.g., Hypervisor) present. The host domain, or OS, may then be provided by the user, with no guest domains utilized. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 614 can maintain a list of events that have occurred in the system, referred to herein as a system event log (SEL). In at least one embodiment, the BMC 614 can receive system event logs from the BIOS 616 on the host processor. The BIOS 616 can provide data for system events over an appropriate interface, such as an I2C interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 618 can prevent the guest operating system, or guest domain 622, from sending such system event log data to the BMC 614. In the case of bare metal access without such a hypervisor, however, user instances can have the ability to send data for system event that spoof events from the BIOS 616. Such activity could lead to compromised bare metal instances being prematurely degraded due to fake system event data produced by the user OS.

In at least one embodiment, however, there will be portions of the physical resource 600 that will be inaccessible to the user OS. This can include, for example, at least a portion of BIOS memory 616. BIOS memory 616 in at least one embodiment is volatile memory such that any data stored to that memory will be lost in the event of a reboot or power down event. The BIOS may keep at least a portion of host memory unmapped, such that it is not discoverable by a host OS. As mentioned, data such as a secret token can be stored to BIOS memory 616 at boot time, before a user OS is executing on the resource. Once the user OS is executing on the resource, that OS will be prevented from accessing that secret token in BIOS memory 616. In at least one embodiment, this secret token (or other stored secret) can be provided to the BMC 614 when adding system event log events, whereby the BMC 614 can confirm that the event is being sent by the BIOS 616 and not by the user OS.

Figure 7:
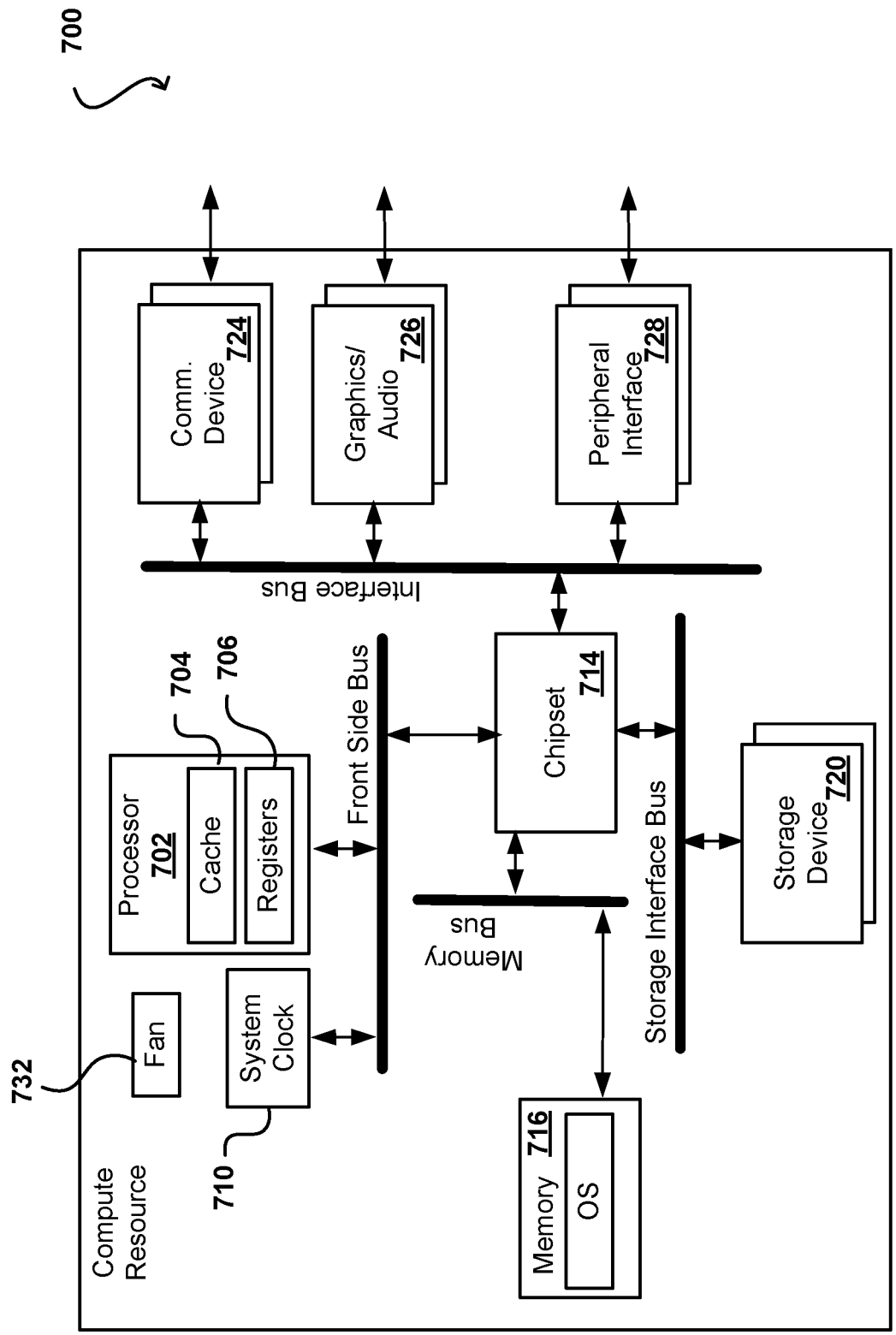
FIG. 7 illustrates example components of a computing device that can be used to implement network monitoring and management aspects of various embodiments.

Computing resources, such as servers, smartphones, or personal computers, will generally include at least a set of standard components configured for general purpose operation, although various proprietary components and configurations can be used as well within the scope of the various embodiments. As mentioned, this may include client devices for transmitting and receiving network communications, or servers for performing tasks such as network analysis and rerouting, among other such options. FIG. 7 illustrates components of an example computing resource 700 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 700 (e.g., a desktop or network server) will have one or more processors 702, such as central processing units (CPUs), graphics processing units (GPUs), and the like, that are electronically and/or communicatively coupled with various components using various buses, traces, and other such mechanisms. A processor 702 can include memory registers 706 and cache memory 704 for holding instructions, data, and the like. In this example, a chipset 714, which can include a northbridge and southbridge in some embodiments, can work with the various system buses to connect the processor 702 to components such as system memory 716, in the form or physical RAM or ROM, which can include the code for the operating system as well as various other instructions and data utilized for operation of the computing device. The computing device can also contain, or communicate with, one or more storage devices 720, such as hard drives, flash drives, optical storage, and the like, for persisting data and instructions similar, or in addition to, those stored in the processor and memory. The processor 702 can also communicate with various other components via the chipset 714 and an interface bus (or graphics bus, etc.), where those components can include communications devices 724 such as cellular modems or network cards, media components 726, such as graphics cards and audio components, and peripheral interfaces 728 for connecting peripheral devices, such as printers, keyboards, and the like. At least one cooling fan 732 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 702 can obtain data from physical memory 716, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 704 in at least some embodiments. The computing device 700 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 728, a communication device 724, a graphics or audio card 726, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 702 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   identifying a hardware security module (HSM) to be deployed in a shared resource environment;
   causing a set of independent services to attempt to set configuration values for respective subsets of a set of configuration parameters of the HSM for deployment, the independent services each to write a health state with a logical timestamp to a shared data store for each attempt;
   determining, using a health service, that the health states written to the shared data store by the independent services indicate that the respective subsets of the set of configuration parameters have the correct configuration values;
   determining, by the health service, a high water timestamp corresponding to a highest value logical timestamp written to the shared data store by the independent services;
   verifying, by the health service, that all of the independent services have written to the shared data store the health state, indicating that all of the subsets have the correct configuration values, with an associated logical timestamp being higher than the high water timestamp; and
   deploying the HSM for use in the shared resource environment.

2. The computer-implemented method of claim 1, further comprising:
   monitoring, by the health service, the health states written to the shared data store during deployment of the HSM in the shared resource environment;
   determining that at least one of the independent services has written a health state to the shared data store indicating that a respective subset of the set of configuration parameters has an incorrect configuration value; and
   removing the HSM from availability within the shared resource environment.

3. The computer-implemented method of claim 1, further comprising:

causing the set of independent services to attempt to set correct configuration values for respective subsets of the set of configuration parameters;

determining, using the health service, that the health states written to the shared data store by the independent services indicate that the respective subsets of the set of configuration parameters have the correct configuration values;

determining, by the health service, a second high water timestamp corresponding to a highest value logical timestamp written to the shared data store by the independent services;

verifying, by the health service, that all of the independent services have written the health state to the shared data store indicating that the respective subsets have the correct configuration values with an associated logical timestamp having a higher value than the second high water timestamp; and causing the HSM to be available for use in the shared resource environment.

4. The computer-implemented method of claim 1, further comprising:

adding an address for the HSM to be added to a domain name system (DNS) pool of available HSMs in the shared resource environment.

5. The computer-implemented method of claim 1, wherein the logical timestamps are Lamport timestamps.

6. A computer-implemented method, comprising:

causing a set of independent services to set values for respective subsets of configuration parameters of a secure hardware device, the independent services writing a respective configuration status and a respective first logical timestamp to a shared location;

determining that the configuration status written to the shared location by all the independent services indicates that the values set for the respective subsets of configuration parameters are correct;

determining that the independent services have written a respective configuration status, indicating that the values remain set for the respective subsets of configuration parameters, with a second logical timestamp being a higher than a highest logical timestamp of the first logical timestamps; and deploying the secure hardware device for use in a shared resource environment.

7. The computer-implemented method of claim 6, wherein the secure hardware device is a hardware security module (HSM).

8. The computer-implemented method of claim 7, wherein the HSM is a physical HSM or a virtual HSM.

9. The computer-implemented method of claim 6, wherein the respective configuration status and the first logical timestamp written to the shared location are analyzed by a health service separate from the independent services.

10. The computer-implemented method of claim 6, further comprising:

monitoring the health states written to the shared location during deployment of the secure hardware device in the shared resource environment;

determining that at least one of the independent services has written a respective configuration status to the shared location indicating that a respective subset of configuration parameters has an incorrect value; and removing the secure hardware device from availability within the shared resource environment.

11. The computer-implemented method of claim 10, further comprising:

causing the set of independent services to attempt to set correct values for respective subsets of the configuration parameters;

determining that the respective configuration status written to the shared location by the independent services indicate that the respective subsets of the configuration parameters have the correct values;

verifying that the independent services have written a respective configuration status, indicating that the correct values remain set for the respective subsets of configuration parameters, with a logical timestamp having a higher value than a highest value of the prior logical timestamps; and causing the secure hardware device to be available for use in the shared resource environment.

12. The computer-implemented method of claim 6, further comprising:

adding an address for the secure hardware device to be added to a domain name system (DNS) pool of available secure hardware devices in the shared resource environment.

13. The computer-implemented method of claim 6, wherein the logical timestamps are Lamport timestamps.

14. The computer-implemented method of claim 6, wherein the set of independent services includes service for at least one of access management, discovery, firmware, or parameter configuration.

15. The computer-implemented method of claim 6, wherein at least a first independent service of the set of independent services has a probability of impacting the respective subset of configuration parameters written by at least a second independent service of the set of independent services, and wherein the set of independent services are not required to operate in a specified order.

16. A system, comprising:

a processor; and memory including instructions that, when executed by the processor, cause the system to:

cause a set of independent services to set values for respective subsets of configuration parameters of a secure hardware device, the independent services writing a respective configuration status and a respective first logical timestamp to a shared location;

determine that the configuration status written to the shared location by all the independent services indicates that the values set for the respective subsets of configuration parameters are correct;

determine that the independent services have written a respective configuration status, indicating that the values remain set for the respective subsets of configuration parameters, with a second logical timestamp being higher than a highest logical timestamp of the first logical timestamps; and deploy the secure hardware device for use in a shared resource environment.

17. The system of claim 16, wherein the secure hardware device is a hardware security module (HSM).

18. The system of claim 16, wherein the respective configuration status and the first logical timestamp written to the shared location are analyzed by a health service separate from the independent services.

19. The system of claim 16, wherein the instructions when executed further cause the system to:

monitor the health states written to the shared location during deployment of the secure hardware device in the shared resource environment;

determine that at least one of the independent services has written a respective configuration status to the shared location indicating that a respective subset of configuration parameters has an incorrect value; and remove the secure hardware device from availability within the shared resource environment.

20. The system of claim 19, wherein the instructions when executed further cause the system to:

cause the set of independent services to attempt to set correct values for respective subsets of the configuration parameters;

determine that the respective configuration status written to the shared location by the independent services indicate that the respective subsets of the configuration parameters have the correct values;

verify that the independent services have written a respective configuration status, indicating that the correct values remain set for the respective subsets of configuration parameters, with a logical timestamp having a higher value than a highest value of the prior logical timestamps; and cause the secure hardware device to be available for use in the shared resource environment.

\* \* \* \* \*